June 11, 1957 C. BÜRKERT 2,795,665
REGULATOR OR CONTROL DEVICE RESPONSIVE
TO HUMIDITY OR MOISTURE OF AIR
Filed Dec. 7, 1954 3 Sheets-Sheet 2

INVENTOR
CHRISTIAN BÜRKERT

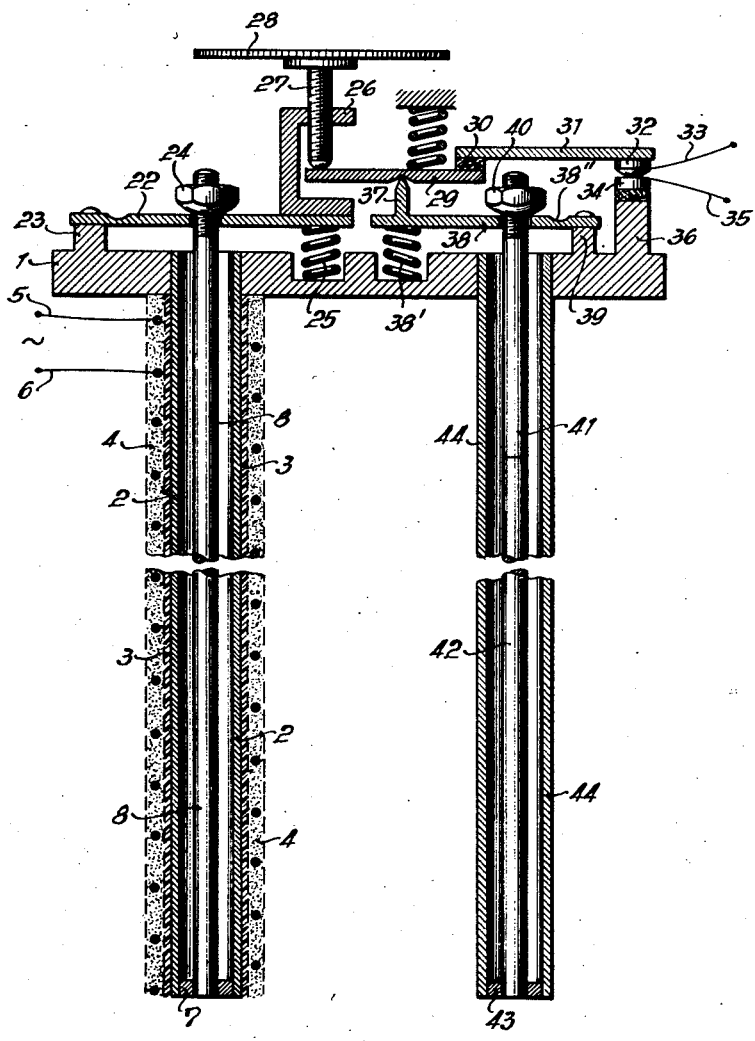

United States Patent Office 2,795,665
Patented June 11, 1957

2,795,665

REGULATOR OR CONTROL DEVICE RESPONSIVE TO HUMIDITY OR MOISTURE OF AIR

Christian Bürkert, Ingelfingen, Germany

Application December 7, 1954, Serial No. 473,638

Claims priority, application Germany December 7, 1953

12 Claims. (Cl. 200—61.06)

This invention relates generally to a regulator or control device which operates in response to changes occurring in the humidity content of gaseous media or gas mixtures, and in particular in the relative humidity or moisture of air. This regulator device makes use of a lithium chloride layer, which forms an electric heating resistance and whose electric conductivity changes in accordance with the moisture content, so that due to Joule's heat effect changes in temperature occur at constant heating voltage and finally an equilibrium temperature is attained, which depends on the changes in moisture content as well as on the temperature of the ambient atmosphere.

These changes in temperature may act on regulator or control elements which are sensitive to temperature changes and through which any suitable system may be influenced through the intermediary of electric contacts for modifying any desirable physical characteristics of the system or for initiating control operations.

In known devices of this type lithium chloride is arranged as a deposit on insulating bodies which are surrounded by a two-wire conductor system to which a heating voltage is applied in the form of an alternating potential.

The cold hygroscopic lithium chloride layer or deposit constitutes due to its moisture content a conductor for the electric current, the conductivity of said layer being diminished or reduced commensurate with the water therein which is driven out during the passage of the electric current by the Joulean heat produced thereby. This phenomenon is continued until the moisture content of the lithium chloride comes into equilibrium at a definite temperature with the partial pressure of the water vapor present in the ambient atmosphere. In the lithium chloride layer and its carrier a predetermined temperature is maintained as long as the electric voltage applied remains at constant value, said temperature depending upon the moisture content of the ambient air and the temperature of the surrounding atmosphere.

The temperature of the carrier or body covered with said lithium chloride layer is consequently a measure of the absolute moisture of the surrounding ambient gas mixture, such as, for instance, the ambient air. The relative moisture may be calculated from the absolute one at known ambient temperature by means of tables.

It is, therefore, an object of the present invention to provide means facilitating control or regulating operations in direct correspondent with relative humidity without the need for consulting tables of relative humidity values.

It is another object of the present invention to provide means affording greatly simplified, yet highly sensitive control or regulating devices which are responsive directly to relative humidity and wherein ambient temperatures are compensated for by means of a mechano-electric transmission system.

More particularly, the present invention is directed to a device of the aforesaid type in which as carrier of the lithium chloride layer at least one rod-shaped element is used which elongates in accordance with temperature and forms part of an extension regulating or control device and preferably is a tubular element.

In a further embodiment of the present invention, the regulating device is provided with at least one additional member which is also sensitive to temperature adjacent or in proximity of the aforesaid extension regulator.

This additional member influences thereby systems or elements which are operatively connected with said regulator which responds to moisture contents, so that further response of the latter to the ambient air temperature will be compensated for, thus making it responsive only to changes in moisture content or humidity variations.

The above and other objects of the invention will become further apparent from the following detailed description, reference being made to the accompanying drawings, showing preferred embodiments of the invention.

In the drawings:

Fig. 3 shows a control device similar to that of Fig. 2, but somewhat modified.

Figure 2:
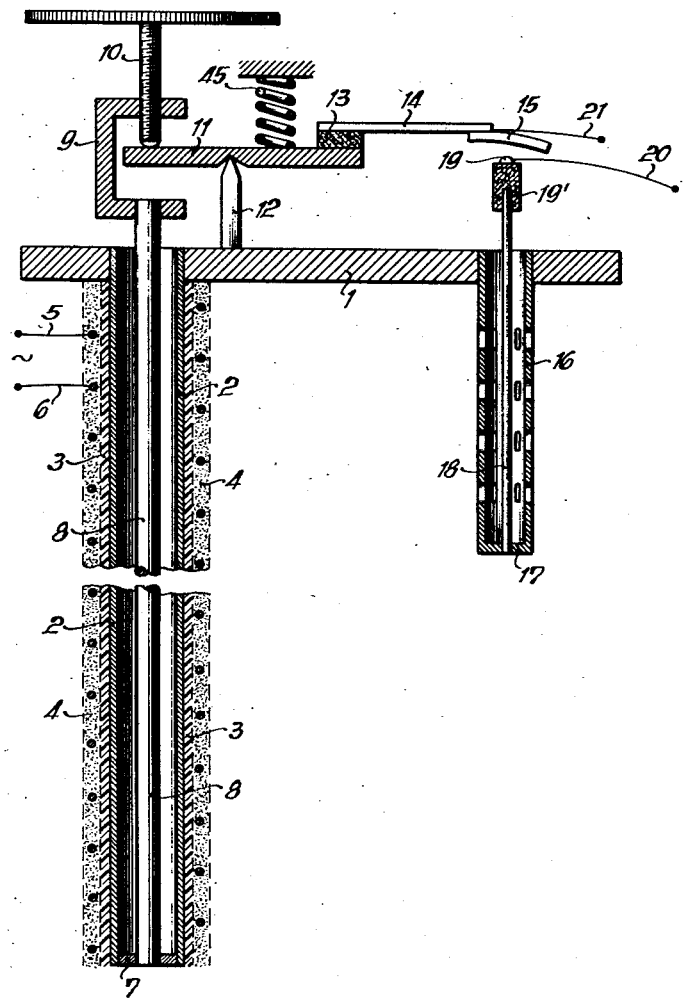
Fig. 2 shows a diagrammatic sectional view of a control device made in accordance with the invention and connected to an electric contact system.

Referring now more particularly to Fig. 2 of the drawings, there is disclosed a base plate 1 to which a tubular member 2 is affixed. Exteriorly of the tube 2 there is provided a layer or deposit of a suitable insulating material 3 around which an absorbent gauze material 4 is wrapped which serves as a carrier for lithium chloride. Two wires 5 and 6 are helically wound around the tubular member 2 in material 4, the turns of the wires running parallel to one another without coming in contact with each other. The bottom end of member 2 is closed by a disk 7 on which is fixed a motion transmitting rod element 8 made of a material having a small coefficient of expansion.

On the upper end of rod element 8 there is mounted a U-shaped headpiece 9 in which an adjustment spindle 10 (for calculated value) is threadedly engaged for vertical movement relative thereto. A bearing lever 11 is pivotally supported on points or knife edges 12. At one end of lever 11 there is mounted a block of insulating material 13 to which an electric contact arm 14 is attached. To the other end of contact arm 14 is attached a curved contact element 15 made preferably of precious metal which cooperates with another contact element 19.

Also fixed on base plate 1 is a perforated tube 16 in the bottom 17 of which a bimetallic strip 18 is inserted and held in desired position. Contact 19 is mounted on the upper end of said strip 18 by means of a block of insulating material 19'. A spring 45 abuts at one end against a fixed stop and at the other end against lever 11 to produce the required pressure for said contacts 15, 19. The two flexible leads or conductors 20 and 21 serve to conduct electric current to the contacts 15 and 19.

The apparatus as seen in Fig. 2 operates as follows:

Depending on the room temperature and the humidity or moisture content of the surrounding air the electric current passing through the lithium chloride layer heats the sensing tubular member 2 to a predetermined temperature. As tubular member 2 expands and is elongated, it entrains rod 8 which expands only a little. Spindle 10 is pressed onto the left hand end of lever 11 by means of said headpiece 9 so that lever 11 rotates counter-clockwise and lifts curved contact element 15. The make and break relation between contacts 15 and 19 is not uniquely defined inasmuch as the elevation position of contact element 15 depends on the room temperature and on the humidity of the surrounding air.

Bimetallic strip 18, of course, is deflected laterally only in accordance with the temperature and thus compensates for the temperature effects of the ambient air due to the particular chosen curvature of contact element 15 in such a manner, that the contacts come into operation only in accordance with an existing relative degree of humidity. In the absence of the bimetallic strip the regulator device thus described would only respond to the absolute degree of humidity. Curved contact element 15 is so shaped and arranged that with increasing temperature of the air surrounding the control elements which respond to the humidity and ambient temperature there occurs an increase of the transmission ratio of the lever.

Referring now to the embodiment disclosed in Fig. 3 there are provided two expansion rod controlling elements of which the left hand one is covered with lithium chloride or like deliquescent substances and heated by an electric current whereas the right hand one responds only to the surrounding or ambient temperature. Base plate 1, tubular members 2, insulating layer 3, lithium chloride carrier 4 and electric heating coils 5 and 6 serve the same purposes as explained in regard to the embodiment of Fig. 2. Disk or plate 7 and the substantially non-elongating motion transmitting rod element 8 serve to actuate a lever 22 which is formed as a spring or resilient member and is fixed to a projection 23 on base plate 1. A nut 24 transmits the pull of rod 8 resulting from elongation of tubular member 2 to lever 22 against the force of the spring 25.

To the right hand end of lever 22 is attached a U-shaped body 26 in which an adjustment spindle 27 carrying a scale 28 is vertically movable by means of threaded engagement with a portion of body 26. A balancing lever 29 carries a block of insulating material 30 mounted at one end thereof. A contact spring 31 is attached at one end to block 30 and is provided at the other end with a contact 32 to which a flexible lead or conductor 33 is connected. A rigid, opposing contact 34 is provided with a conductor 35 and is attached to a projection 36 of base plate 1 by means of a block of insulating material.

Lever 29 is supported by a knife edge 37 which in turn is mounted on the left hand end of a spring-like lever 38, which is supported on a spring 38'.

The fulcrum point of lever 38 is located adjacent the upper end of a projection 39 on base plate 1 as lever 38 is of a reduced thickness at 38''. A nut 40 threaded onto rod 41 of a second expansion control element transmits to lever 38 its oscillating movement. Rod 41 in this embodiment is provided with a downward extension portion 42 made of a material having a small coefficient of expansion. This rod 42 is fixedly held in plate 43 and connected therethrough to a tube 44 made of a material having a high thermal coefficient of expansion. Tube 44 is affixed to base plate 1. A spring 45 inserted between a fixed abutment and lever 29 provides the required pressure for the electric contacts 32, 34.

The operation of the device of Fig. 3 is as follows:

The temperature and humidity conditions affecting tube 2 cause the latter to expand or contract and to actuate through rod 8 and lever system 22, 29, and 38 the electric contacts 32, 34. Tube 44 responds solely to ambient temperature conditions, the effect of which is transmitted to the lever system and thus to contacts 32, 34 by means of rod 41, 42, and lever 38. The lever 38 with its knife edge 37 thus acts on lever 29, changes its relative position by elevating or lowering the knife edge support 37 and thus regulates the distance between contacts 32 and 34 for the ensuing operation of the electric system.

Thus, it may be seen, that in its broadest aspects the present invention contemplates the provision in a humidity responsive control device, of a base plate, a sensing element mounted on said base plate, a carrier surrounding said element, a layer of deliquescent material on said carrier, said sensing element being responsive to changes in temperature and, when surrounded by said carrier and said layer responding to both temperature and humidity conditions, temperature compensating means mounted on said base plate, and electric contact means operable by said sensing element and by said temperature compensating means, whereby changes of temperature affecting said sensing element are eliminated and said contact means operate solely in response to humidity conditions.

Figure 1:
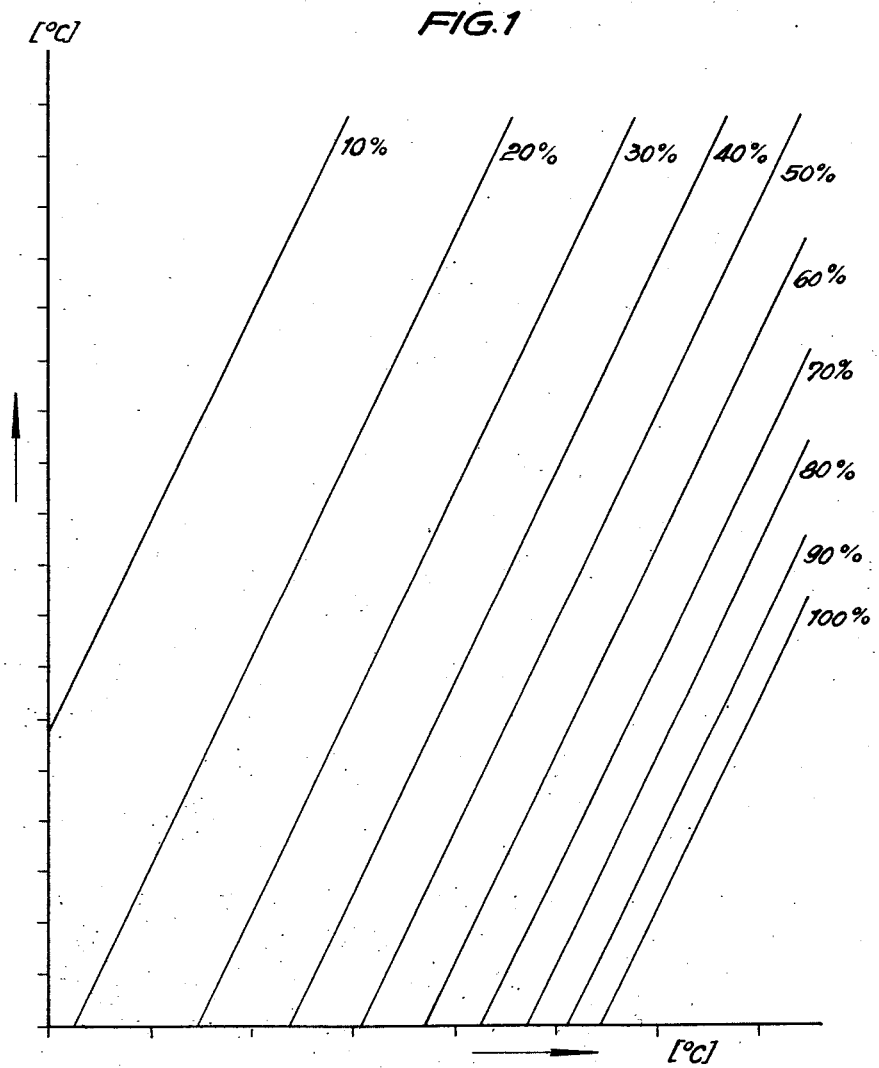
Fig. 1 shows a diagram presenting interrelationship between ambient temperature, relative humidity and the temperature in proximity to a deliquiescent substance (lithium chloride) layer employable in a control device embodying the invention.

The embodiment of Fig. 3 differs from that of Fig. 2 only in that a second rod control arrangement 38 and 41 to 44 is employed in lieu of the curved contact element 15 in order to compensate for the influence of the surrounding room temperature. The lever arrangement and especially the lever transmission ratio can be predetermined in accordance with the distance of the curves seen in the diagram of Fig. 1 whereby the control device responds only to relative humidity. In order to additionally influence this dependence in one or another direction the central rod of the right hand control device in Fig. 3 is constructed of two materials having respectively high and low coefficients of expansion.

It is possible to attach to the thermally responsive expansible tubular members 2 and 44 or to some suitable transmission member auxiliary heating means in order to facilitate return of the system to its starting position. Moreover, in lieu of slowly moving contacts magnetic or spring snap switches may be employed, as well as other devices for altering any of the physical characteristics of the system.

Various changes and modifications may be made without departing from the spirit and scope of the present invention and it is intended that such obvious changes and modifications be embraced by the annexed claims.

Having thus described the invention, what is claimed as new and desired to be secured by Letters Patent, is:

1. In a humidity responsive control device; a base plate, a tubular, longitudinally expansible and contractible sensing element having a relatively high coefficient of thermal expansion mounted on said base plate, a carrier surrounding said element, a layer of deliquescent material arranged on said carrier, heating means embedded in said layer and surrounding said tubular sensing element and in conjunction with said layer rendering said sensing element responsive to both temperature and humidity conditions, electric contact means, means having a relatively low coefficient of expansion operatively connecting said tubular sensing element to a part of said contact means, and temperature compensating means mounted on said base plate and operatively connected to said contact means to thereby render the latter responsive to joint action of said sensing element and said temperature compensating means, whereby effects of changes of temperature causing longitudinal expansion or contraction of said sensing element are eliminated and operation of said contact means occurs solely in response to humidity conditions.

2. In a humidity responsive device; a base plate, a longitudinally elongatable and contractible tubular sensing element mounted on said base plate, a carrier surrounding said sensing element, a layer of deliquescent material on said carrier, electric heating means embedded in said layer and surrounding said sensing element and rendering the same responsive to changes in both temperature and humidity conditions, temperature compensating means mounted on said base plate and including a bimetallic element, said tubular sensing element having a relatively high coefficient of thermal expansion, motion transmitting means having a relatively low coefficient of thermal expansion connected to said sensing element and movable therewith, and electric contacts operatively connected to said motion transmitting means and to said bimetallic element, respectively, whereby effects of temperature changes affecting said sensing element are eliminated and said contacts are operated solely in response to humidity conditions.

3. A device according to claim 2, one of said contacts comprising a contact element having a predetermined curvature correlated with the temperature response characteristics of said bimetallic element.

4. A device according to claim 3, further including lever means operatively connected to both said motion transmitting means and said one contact for transmitting movements of said sensing element to said one contact.

5. A device according to claim 4, further including mechanical means contacting said lever means to vary the normal position thereof and to thereby adjust the position of said one contact relative to another of said contacts.

6. A device according to claim 2, said compensating means further including a tubular member open at one end and closed at the other end and provided with perforations in its wall, said member being mounted on said base plate, and said bimetallic element being fixed in said closed end and extending through said member, whereby surrounding atmosphere may enter said member through said perforations to some in thermal contact with said bimetallic element.

7. A device according to claim 2, said deliquescent material being lithium chloride.

8. In a humidity responsive control device; a base plate, a first longitudinally elongatable and contractible tubular sensing element mounted on said base plate and having a high coefficient of thermal expansion, a carrier surrounding said sensing element, a layer of deliquescent material on said carrier, electric heating means embedded in said layer and surrounding said tubular sensing element to render the same responsive to changes in both temperature and humidity conditions, temperature compensating means mounted on said base plate and including a second longitudinally elongatable and contractible tubular sensing element having a high coefficient of thermal expansion so as to be responsive to temperature changes, first motion transmitting means having a low coefficient of thermal expansion and connected to said first sensing element for movement therewith, a movable electric contact, a lever system interconnecting said movable contact with said first motion transmitting means, a fixed electric contact mounted on said base plate in cooperative relation to said movable contact, and second motion transmitting means having at least partly a low coefficient of thermal expansion and connected to said second sensing element for movement therewith, said second motion transmitting means being operatively connected to said lever system so as to modify the movements of the latter and thus of said movable contact as produced by said first sensing element in accordance with the temperature changes affecting said second sensing element, whereby effects of temperature changes are eliminated and said movable contact is operated solely in response to humidity conditions.

9. A device according to claim 8, further including means operatively connected to said lever system for adjusting the initial position of said movable contact relative to said fixed contact.

10. A device according to claim 8, said first motion transmitting means comprising a rod arranged within and extending through said first tubular sensing element, one end of said rod being connected to one end of said first sensing element and the other end of said rod being connected to said lever system.

11. A device according to claim 10, said second motion transmitting means comprising a pair of rod elements located within and extending through said second tubular sensing element, one of said rod elements having a low coefficient of thermal expansion and being connected at one of its ends to said second sensing element and at its other end to one end of the other rod element, the other end of said other rod element being connected to said lever system.

12. A device according to claim 8, further comprising auxiliary heating means operatively connected to said tubular sensing elements, respectively, for returning the same together with said movable contact and said lever system to their starting positions.

References Cited in the file of this patent
UNITED STATES PATENTS

| | | |
|---|---|---|
| 2,229,612 | Pearce | Jan. 21, 1941 |
| 2,343,878 | Allen et al. | Mar. 14, 1944 |
| 2,563,341 | Kettering | Aug. 7, 1951 |